US009721473B2

(12) United States Patent
Patel et al.

(10) Patent No.: US 9,721,473 B2
(45) Date of Patent: Aug. 1, 2017

(54) ASSET TRACKING SYSTEM

(75) Inventors: Sanjaykumar R. Patel, Bristow, VA (US); Glenn Bramer, Fairfax, VA (US); J. Trevor Harris, Fairfax, VA (US); Adam Gardner, Tempe, AZ (US)

(73) Assignee: Trimble Inc., Sunnyvale, CA (US)

( * ) Notice: Subject to any disclaimer, the term of this patent is extended or adjusted under 35 U.S.C. 154(b) by 842 days.

(21) Appl. No.: 13/006,319

(22) Filed: Jan. 13, 2011

(65) Prior Publication Data

US 2012/0185168 A1 Jul. 19, 2012

(51) Int. Cl.
*G01C 21/00* (2006.01)
*G08G 1/00* (2006.01)

(52) U.S. Cl.
CPC .................................... *G08G 1/20* (2013.01)

(58) Field of Classification Search
USPC ................ 705/28, 330, 50, 400, 7.21, 7.13; 701/482, 519; 340/988, 539.13; 709/224
See application file for complete search history.

(56) References Cited

U.S. PATENT DOCUMENTS

| | | | | |
|---|---|---|---|---|
| 6,580,367 | B2 * | 6/2003 | Roach | 340/471 |
| 6,611,755 | B1 | 8/2003 | Coffee et al. | |
| 6,633,239 | B2 | 10/2003 | Plude et al. | |
| 6,892,131 | B2 | 5/2005 | Coffee et al. | |
| 7,019,639 | B2 * | 3/2006 | Stilp | 340/531 |
| 7,342,497 | B2 * | 3/2008 | Chung et al. | 340/572.1 |
| 7,489,993 | B2 * | 2/2009 | Coffee et al. | 701/32.3 |
| 8,047,432 | B2 | 11/2011 | Breed | |
| 8,384,542 | B1 * | 2/2013 | Merrill et al. | 340/541 |
| 8,386,324 | B2 * | 2/2013 | Lin | 705/22 |
| 8,965,670 | B2 * | 2/2015 | Peterson | G06F 17/30241 455/457 |
| 2003/0038713 | A1 * | 2/2003 | Plude et al. | 340/426 |
| 2004/0008103 | A1 * | 1/2004 | Kady | B60R 25/04 340/5.52 |
| 2004/0181495 | A1 * | 9/2004 | Grush | G06Q 30/0284 705/417 |

(Continued)

*Primary Examiner* — Vanel Frenel
(74) *Attorney, Agent, or Firm* — Kilpatrick Townsend & Stockon LLP

(57) ABSTRACT

An asset tracking system including a dispatching system and a movable object module. The dispatching system includes a processing device configured for controlling the dispatching system, a position information receiver configured for receiving position information associated with a movable object, a position data store configured for storing the position information, and a report module configured for reporting the position information to a first non-owning entity, wherein the report module includes a verification unit configured for receiving verification information corresponding to the first non-owning entity; and a position information reporter configured for, upon receipt of the verification information, providing the position information to the first non-owning entity, wherein the position information is inaccessible to a second non-owning entity lacking the verification information. The movable object module determines the position information corresponding to the movable object and transmits the position information to the position information receiver.

18 Claims, 12 Drawing Sheets

(56) References Cited

U.S. PATENT DOCUMENTS

| | | | | |
|---|---|---|---|---|
| 2005/0109845 | A1* | 5/2005 | Ghaffari | G05B 19/00 235/385 |
| 2005/0131645 | A1* | 6/2005 | Panopoulos | B60P 1/5457 701/472 |
| 2006/0085235 | A1* | 4/2006 | Nguyen et al. | 705/7 |
| 2006/0182055 | A1* | 8/2006 | Coffee | H04L 67/04 370/328 |
| 2006/0224797 | A1* | 10/2006 | Parish et al. | 710/62 |
| 2007/0268155 | A1* | 11/2007 | Holmes | G01S 5/0289 340/901 |
| 2008/0189069 | A1* | 8/2008 | Beck | G06Q 10/06 702/123 |
| 2008/0234878 | A1* | 9/2008 | Joao | B60R 25/102 701/2 |
| 2008/0262646 | A1* | 10/2008 | Breed | 700/226 |
| 2009/0198371 | A1* | 8/2009 | Emanuel | B66F 9/0755 700/226 |
| 2009/0307039 | A1* | 12/2009 | Seeds | G06Q 10/06 705/332 |
| 2010/0185524 | A1* | 7/2010 | Watkins | G06Q 10/08 705/22 |
| 2011/0295724 | A1* | 12/2011 | Hill | 705/28 |
| 2012/0095926 | A1* | 4/2012 | Nishimura et al. | 705/301 |

* cited by examiner

600

ASSET TRACKING SYSTEM

BACKGROUND

In general, a variety of entities, such as individuals, groups, businesses, etc., require items to be transported from one place to another. While an individual might have furniture delivered across country, a group may contract for perishable party food to be delivered, and a business may have large shipments of plants delivered at a certain time on a certain day.

There is a strong desire to have shipped items arrive at an exact time on an exact day. Since on-time delivery is critical for vehicle fleets carrying desired and/or perishable items, efficient vehicle fleet management is essential. To effectively manage supply and demand, vehicle fleet dispatchers need to know not only the precise locations of their vehicles, but also what state of the delivery cycle each vehicle is in at all times. Relying only on driver updates can result in less accurate information.

Figure 1A:
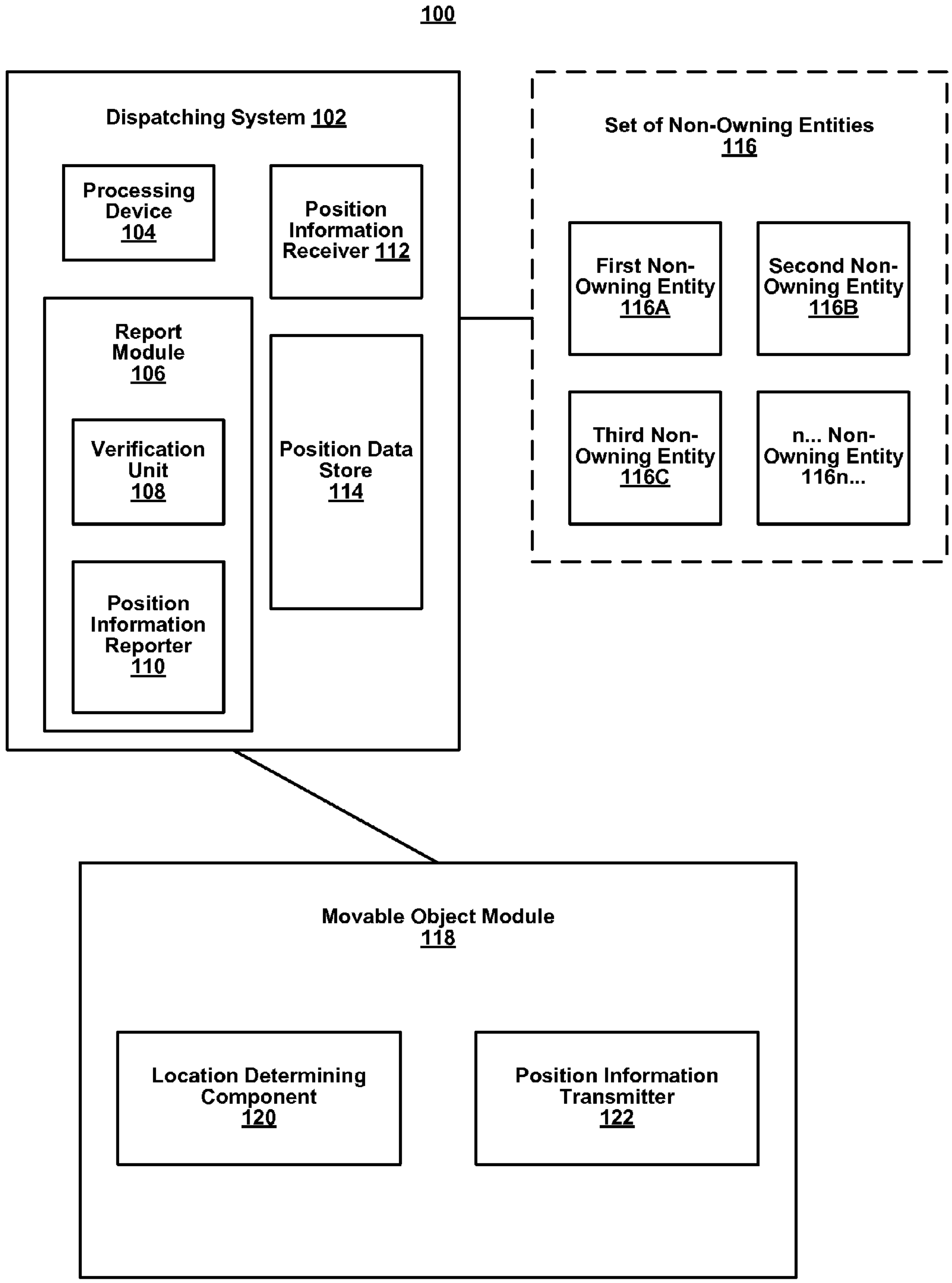
FIG. 1A is a block diagram of an example system for tracking assets, according to an embodiment of the present technology.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as “receiving”, “verifying”, “assigning”, “reporting”, “requesting”, “determining”, “sending”, “repeating”, “instructing”, or the like, refer to the actions and processes of a computer system, or similar electronic computing device. The computer system or similar electronic computing device manipulates and transforms data represented as physical (electronic) quantities within the computer system’s registers and memories into other data similarly represented as physical quantities within the computer system memories or registers or other such information storage, transmission, or display devices. The present technology is also well suited to the use of other computer systems such as, for example, optical computers.

The discussion will begin with a brief overview of the current method of communicating with delivery/hauling vehicle drivers during the transportation of materials. The discussion will then focus on embodiments of the present technology that provide a system for tracking assets during delivery.

Overview

Currently, in order for multiple material providers to track the delivery of its material, the driver of the hauling vehicle must manage multiple in-vehicle devices devoted to each material provider and/or manually shut down communication with one material provider in order to communicate exclusively with another material provider.

Embodiments of the present technology provide a management solution for communicating with the hauling vehicles during material delivery. An embodiment uses a location determining component that continuously determines the hauling vehicle’s location. The resulting tracking data, such as position information, is automatically reported over a wireless connection to a dispatching center controlling the hauling vehicle fleet. While the data is then stored in a secure position data store at the dispatching center, the data remains accessible to entities that provide the proper verification information to the dispatching center. Thus, once the material provider provides the proper verification information, past and current position information is released from its stored secure location to the material provider.

Therefore, a material provider who has presented to the dispatching center proper identity, such as verification information, may access the position information of its material as it is being hauled to a selected destination. On the other hand, a material provider who is not able to present this proper verification information will not be given access to the same position information. In this way, different material providers are able to concurrently access position information relating to their own hauled material, without being able to view each others’ position information. (A more detailed description of the operation of embodiments of the present technology appears in the Operations section below.)

For example, in one embodiment, a movable object module allows drivers and dispatchers to communicate more effectively with time stamped messages regarding work status or delays. Dispatchers are shown real-time locations of each vehicle in a fleet of vehicles. An embodiment enables dispatchers to send and receive messages regarding the position information and vehicle fleet scheduling, generate reports and adjust schedules. Further, embodiments provide needed information for making intelligent business decisions that decrease operational costs and increase the customer's satisfaction.

Further, embodiments provide the real-time location of every vehicle hauling material without the need for driver involvement. Embodiments provide the dispatcher with information associated with all stages of the delivery cycle, such as but not limited to the following: driver ID login; ignition on/off; load time; depart/arrive plant; drive to the job; arrive at the job; the job wait time; the pour time; the washout time; the idle time after washout; and the time of departure for the job.

The following discussion will begin with a description of the structure of the components of the present technology. The discussion will then be followed by a description of the components in operation.

Structure

With reference to FIG. 1, a block diagram of an example system 100 for tracking assets is shown, in accordance with an embodiment of the present technology. In embodiments, the term assets refers to movable objects. These movable objects, such as a hauling vehicle, may haul materials, such as but not limited to, concrete, aggregate, bricks, stone, furniture, food, toys, etc. from a first place to a second place. The asset tracking system 100 includes a dispatching system 102 and a movable object module 118.

In one embodiment, the dispatching system 102, and/or a part thereof, is managed by an owner of the assets. In another embodiment, the dispatching system 102, and/or a part thereof, is managed by a third party, other than an owner of the assets, an operator of the movable object and/or a material provider. In one embodiment, the dispatching system 102 is internal to the asset owner's systems. For example, the asset owner operates a system with which the dispatching system 102 is coupled. In another embodiment, the dispatching system 102 is external to the asset owner's system. For example, a third party operates the dispatching system 102 and communicates relevant information to the asset owner, movable objects and/or one or more of the plurality of non-owning entities. Relevant information includes, but is not limited to, all information relating to the operation of the movable objects and the relationship between the asset owner, movable objects and one or more non-owning entities (e.g. position information, reporting instructions, hauling instructions, requests for position information, requests for verification information and responses to requests for verification information, etc.).

In one embodiment, the dispatching system 102 includes a processing device 104, a position information receiver 112, a position data store 114 and a report module 106. In one embodiment, the movable object module 118 includes a location determining component 120 and a position information transmitter 122.

In one embodiment, the processing device 104 controls the dispatching system 102. In one embodiment, the position information receiver 112 receives receiving position information associated with a movable object. In one embodiment, a movable object is any object that may be moved. For example, a movable object may be a hauling truck, a delivery truck, a mail truck, a bus, a taxi, etc. In one embodiment, the position information is information of the current location of the movable object. Further, the position information may include the velocity of the movable object, and a time at which the movable object experiences the velocity at a certain location.

In one embodiment, the position data store 114 stores the position information. In one embodiment, the report module 106 reports the position information to a non-owning entity. In one embodiment, the reporting is done wirelessly. The term, "owning entity" refers to the owner of the movable object, such as but not limited to, the owner of a hauling vehicle. The term, "non-owning entity" refers to an entity with whom the non-owning entity chooses to share its position information.

In one embodiment, the report module 106 includes a verification unit 108 and a position information reporter 110. In one embodiment, the verification unit 108 receives verification information corresponding to the non-owning entity. In one embodiment, the verification information is information that is communicated by the non-owning entity that signifies that that non-owning entity is privileged to view the requested position information. FIG. 1A shows a set of non-owning entities 116, including first non-owning entity 116A, second non-owning entity 116B, third non-owning entity 116C and *n* . . . non-owning entity 116*n* . . . . It should be appreciated that there may be any number of non-owning entities using the asset tracking system 100 of embodiments of the present technology.

Figure 1B:
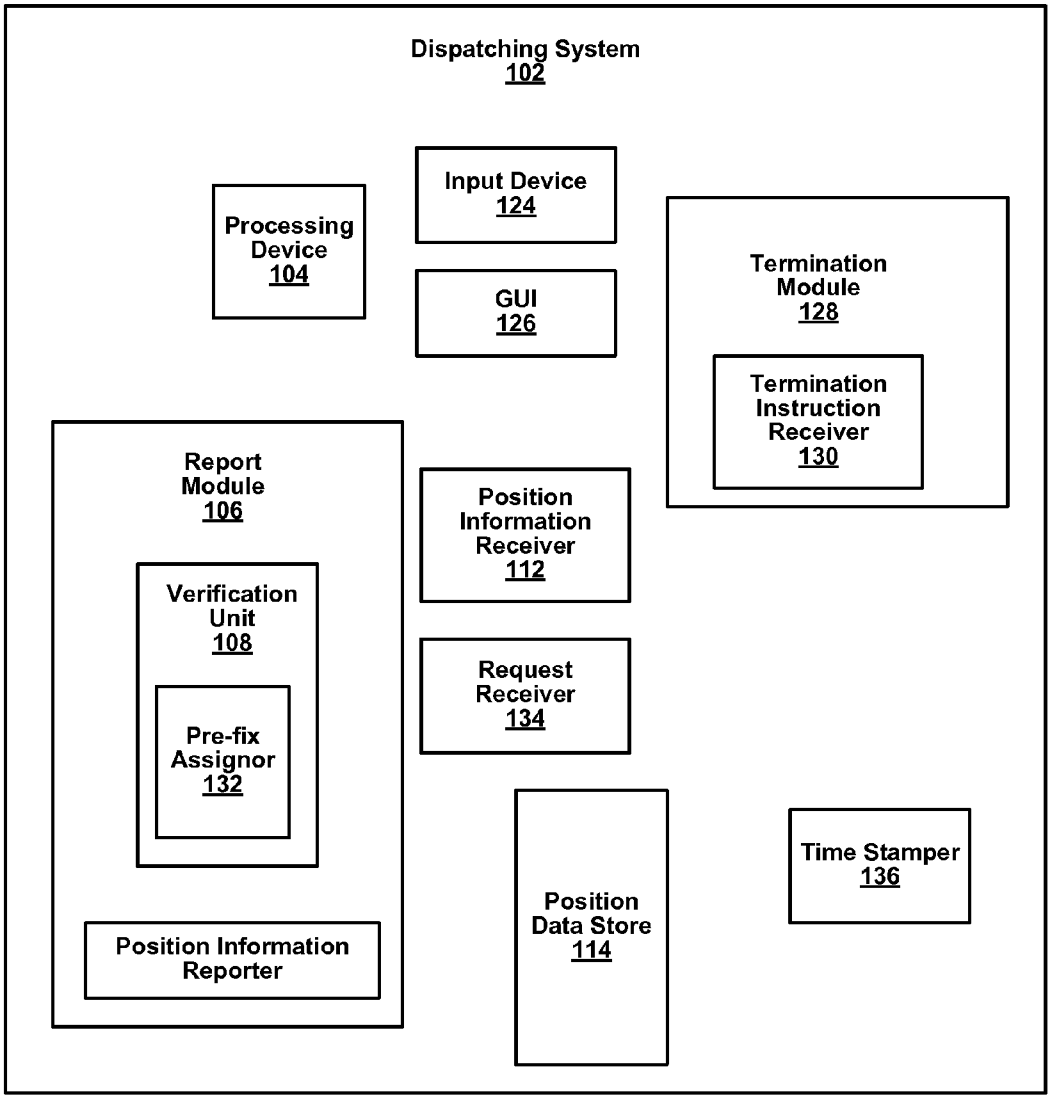
FIG. 1B is a block diagram of an example dispatching system for tracking an asset, according to an embodiment of the present technology.

FIG. 1B is a block diagram of an example dispatching system 102 for tracking assets, in accordance with an embodiment of the present technology. With reference now to FIGS. 1A and 1B, in one embodiment, the verification information unit 108 includes a pre-fix assigner 132. The pre-fix assigner 132 assigns a pre-fix as part of the verification information. The assigned pre-fix is associated with a transporter (e.g., hauling vehicle) of a material. For example, the pre-fix may be an abbreviation of Material Provider A of, for example, concrete, "opA", combined with the abbreviation of Hauler A, "hA", to achieve the combination, "opA-hA". While abbreviations of the material provider and the hauler are shown herein to be "opA" and "hA", respectively, it should be understood that any abbreviations may be used, for one or both the material provider and the hauler.

Further, in one embodiment, the pre-fix is the totality of the verification information. In another embodiment, the pre-fix is just a part of the verification information. In one embodiment, the verification information includes a set of numbers. In another embodiment, the verification information includes a set of letters. Yet, in another embodiment, the verification information includes an alphanumeric code. In another embodiment, the verification information includes a set of numbers and letters. Of note, it should be appreciated that a reference to a set may be one or more characters in the set.

in one embodiment, the position information reporter 110, upon receipt of the verification information, provides position information to the first non-owning entity 116A, wherein the position information is inaccessible to a second non-owning entity, such as second non-owning entity 1168, lacking the verification information. In other words, only the non-owning entity that has and communicates the verification information to the report module 106 (and in some embodiments, the position information reporter 110) is provided with the position information.

In one embodiment, the dispatching system 102 includes an input device 124 that is coupled with the processing system 104. The input device 124 receives input. The input may be any form of communication that may be transmitted to the processing device 104 via an input device 124. For example, the input device 124 may be but is not limited to a keyboard, mouse, touch screen, etc. In one embodiment, the dispatching system 102 includes a graphical user interface 126 ("GUI 126") that is coupled with the processing device 104. The GUI 126 is used to interact with the dispatching system 102 via the input device 124. Further, the GUI 126 may be used to view ongoing operations within and/or interacting with the dispatching system without the use of an input device 124.

In one embodiment, the dispatching system 102 includes a request receiver 134 that is coupled with the processing device 104. The request receiver 134 receives a request from the non-owning entity for access to the position information. In another embodiment, the dispatching system 102 includes a termination module 128. In one embodiment, the termination module 128 disables the position information reporter 110. In another embodiment, the termination module 128 disables the report module 106.

In one embodiment, the termination module 128 includes a termination instruction receiver 130. In one embodiment, the termination instruction receiver 130 receives an instruction to disable the position information reporter 110 (or the report module 106 in another embodiment) from an operator of the dispatching system. In one embodiment, the termination module 128 only responds to the operator of the dispatching system 102. Yet, in another embodiment, the termination module 128 only responds to instructions from the movable object module 118. In another embodiment, the termination module 128 responds to instructions from both the dispatching system 102 and the movable object module 118.

In one embodiment, the dispatching system 102 includes a time stamper 136. The time stamper 136 labels with a time of a continuous stream and/or a still view of position information that is provided from the movable object module 118 to the dispatching system 102. In one embodiment, the time is the real time at which the still view and/or continuous stream is determined by the location determining component 120.

Figure 1C:
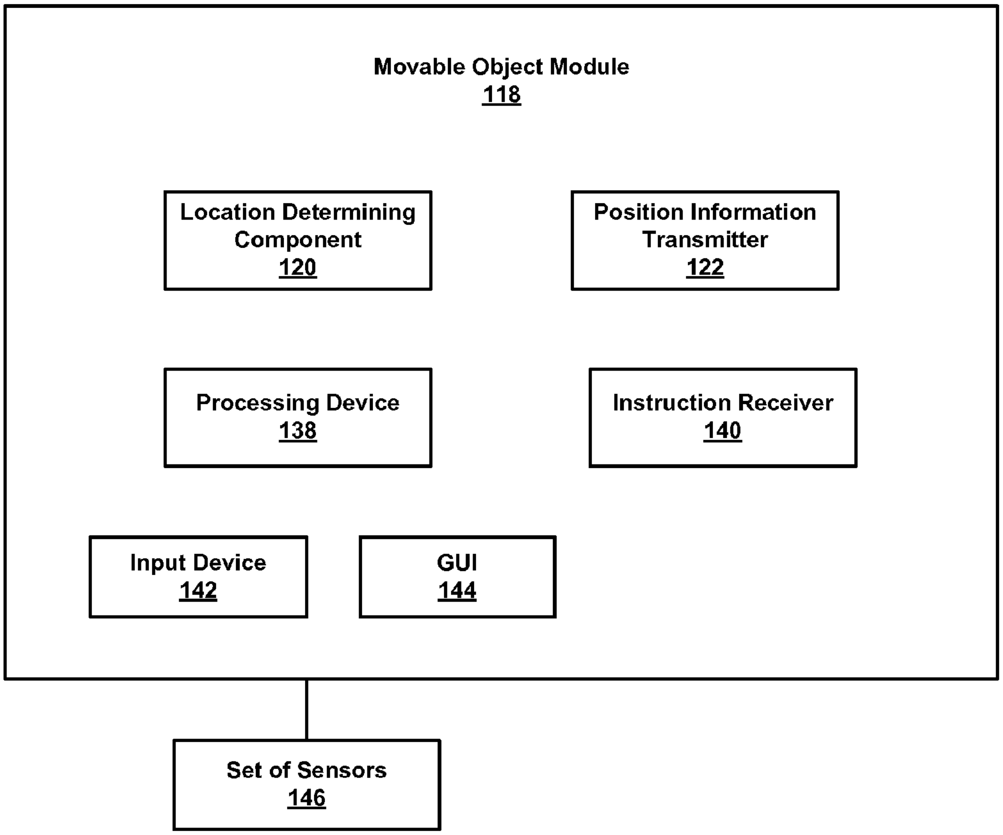
FIG. 1C is a block diagram of an example movable object module for tracking an asset, according to an embodiment of the present technology.

FIG. 1C is a block diagram of an example movable object module 118 for tracking assets, in accordance with an embodiment of the present technology. With reference now to FIGS. 1A through 1C, in one embodiment, the movable object module 118 includes a location determining component 120 and a position information transmitter 122.

In one embodiment, the location determining component 120 determines the position information corresponding to the movable object. In one example, concrete is hauled by the movable object. In one embodiment, the location determining component 120 may be any device that is capable of determining the location of a stationary or moving object, for example but not limited to, a global navigational satellite system receiver.

In one embodiment, the position information transmitter 122 is coupled with the location determining component 120. The position information transmitter 122 transmits the position information to the position information receiver 112 of the dispatching system 102. In one embodiment, the transmitting is performed wirelessly.

In another embodiment, the position information is received by an application. In yet another embodiment, after being received by the application, the position information is then received by a dispatching system 102. In one embodiment, the application is internal to the dispatching system 102. Yet in another embodiment, the application is external and remote from the dispatching system 102.

Further, in one embodiment, the movable object module 118 includes a processing device 138. The processing device 138 controls the movable object module 118, in one embodiment. In another embodiment, the movable object module 118 includes an instruction receiver 140. The instruction receiver 140 receives an instruction associated with the movable object, in one embodiment. In one embodiment, the instruction includes a hauling instruction. The hauling instruction refers to any instruction that is related to a hauling agenda, such as but not limited to, a hauling beginning and ending location, routes, etc.

In another embodiment, the movable object module 118 includes an input device 142 coupled with the processing device 138. The input device 142 receives input information. In yet another embodiment, the movable object module 118 includes a graphical user interface 144 ("GUI 144") coupled with the processing device 138.

In one embodiment, the movable object module 118 is coupled with a set of sensors 146. Each sensor of the set of sensors 146 collects status information associated with the movable object. It should be appreciated that the set of sensors 146 may be one or more sensors. The term status information in the context of the set of sensors 146 includes information such as but not limited various operational features of the movable object. For example, if the movable object is a concrete hauling truck, a sensor may detect the commencement and/or the termination of the pouring, the temperature of the concrete, the consistency of the concrete, etc. This information may also be reported to the dispatching system 102 via a status reporter coupled with the movable object module 118.

Figure 1D:
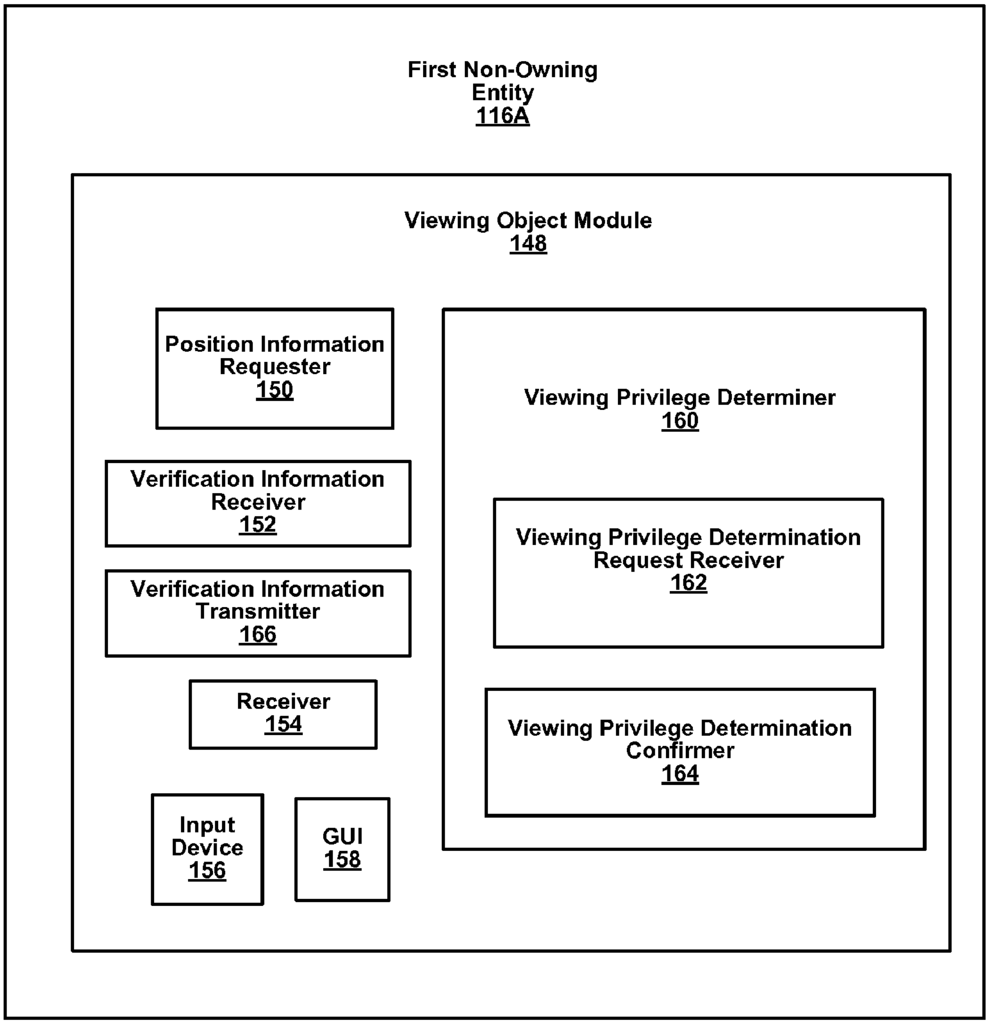
FIG. 1D is a block diagram of an example viewing module of a non-owning entity, the viewing module for tracking an asset, according to an embodiment of the present technology.

FIG. 1D is a block diagram of an example viewing object module 148 for tracking assets, in accordance with an embodiment of the present technology. With reference now to FIGS. 1A through 1D, in one embodiment the viewing object module 148 includes a position information requester 150, a viewing privilege determiner 160, a verification information receiver 152, a verification information transmitter 166 and a receiver 154.

In one embodiment, the position information requester 150 requests access to position information corresponding to a movable object, wherein the position information is located at a dispatching system 102. In context, the term, "access", refers to the ability to view the position information. This could either be through retrieving the information or being provided the information.

In one embodiment, the viewing privilege determiner 160 establishes a viewing privilege of the non-owning requesting entity to view the position information. For example, once the position information requester 150 requests access to the position information, then a viewing privilege determiner 160 communicates with the dispatching system 102 to indicate that the non-owning entity with which the viewing object module 148 is coupled is allowed to view the position information. As an example, the dispatching system 102 may receive a request from entity A for position information of the movable object carrying entity B's material. Once dispatching system 102 receives this request, the dispatching system 102 then communicates with entity B to make sure that entity B in fact wants to view the position information associated with the movable object. In this case, the dispatching system 102 may discover that entity B did not in fact request the position information.

In one embodiment, the viewing privilege determiner 160 includes a viewing privilege determination request receiver 162 and a viewing privilege determination confirmer 164. In one embodiment, the viewing privilege determination request receiver 162 receives a viewing privilege determination request from the dispatching system 102. In one embodiment, the viewing privilege determination confirmer 164 confirms the viewing privilege for the viewing object module 148 of the position information.

In one embodiment, the verification information receiver 152, after the viewing privilege is established, receives from the dispatching system 102 verification information corresponding to the position information of the movable object. The verification information, once presented to the dispatching system 102, enables access to the position information.

In one embodiment, the verification information transmitter 166 presents the verification information to the dispatching system 102. In another embodiment, the receiver 154 receives the position information after the verification information is presented to the dispatching system 102. As described herein, the position information is inaccessible to a non-owning entity that lacks the verification information for presentation.

In one embodiment, the viewing object module 148 includes an input device 156 such as the input devices described herein. In yet another embodiment, the viewing object module 148 includes a graphical user interface 158 ("GUI 158"), such as is described herein.

Figure 2A:
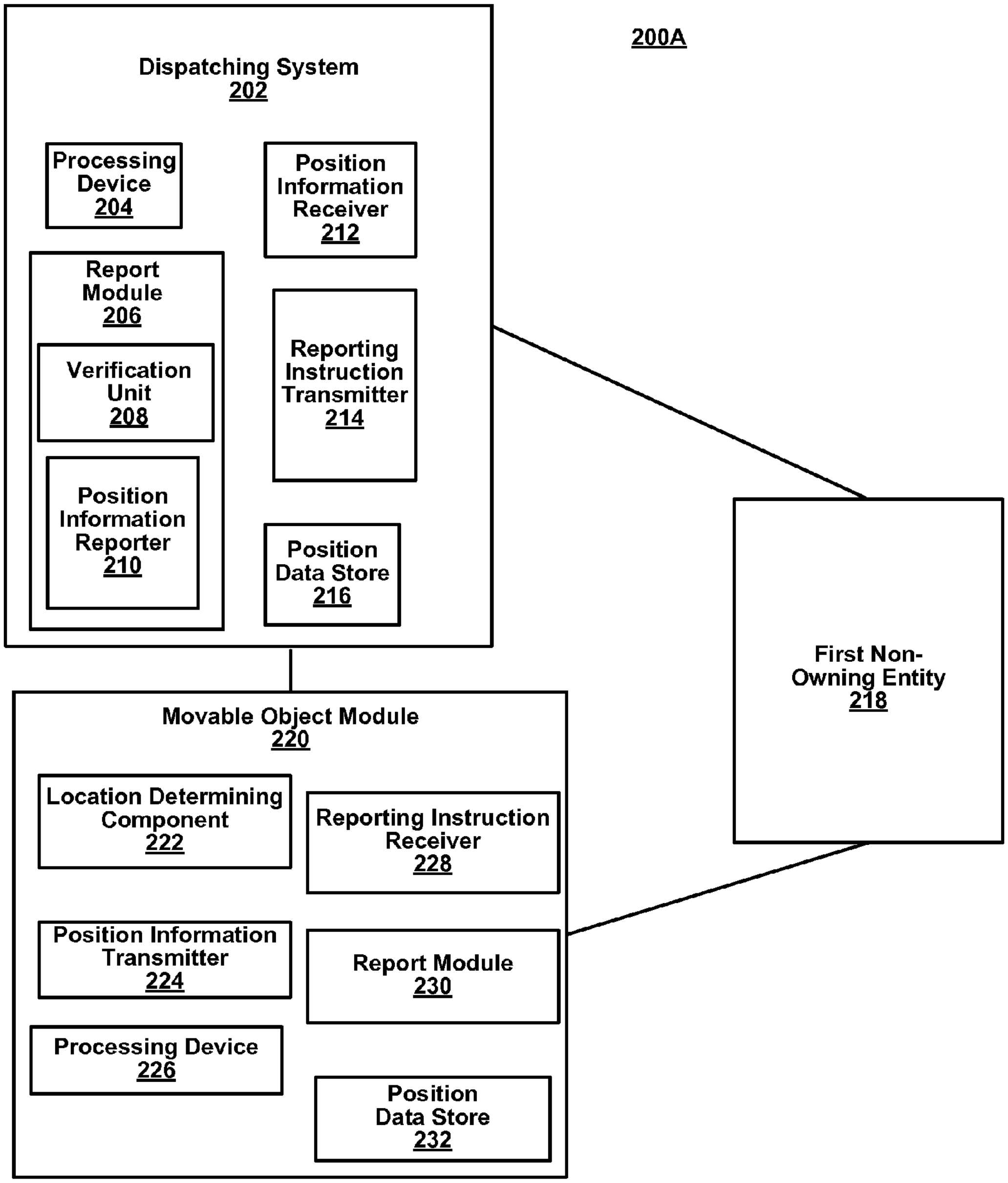
FIG. 2A is a block diagram of an example system for tracking assets, according to an embodiment of the present technology.

FIG. 2A is a block diagram of an asset tracking system 200A, according to one embodiment of the present technology. FIG. 2A shows an asset tracking system 200A in which both the dispatching system 202 and the movable object module 220 may report position information to a non-owning entity 218.

The asset tracking system 200A includes a dispatching system 202 and a movable object module 220. In one embodiment, the dispatching system 202 includes a processing device 204, a position information receiver 212, a position data store 216, a report module 206 and a reporting instruction transmitter 214. In one embodiment, the movable object module 220 includes a processing device 226, a location determining component 222, a position data store 232, a position information transmitter 224, a reporting instruction receiver 228 and a report module 230.

in one embodiment, the processing device 204 controls the dispatching system 200A. In one embodiment, the position information receiver 212 receives position information associated with a movable object. In another embodiment, the position data store 216 stores the position information. In yet another embodiment, the report module 206 reports the position information to a first non-owning entity 218. The report module 206 includes a verification unit 208 and a position information reporter 210 as have already been described herein. In another embodiment, the reporting instruction transmitter 214 transmits a reporting instruction. In one embodiment, the reporting instruction directs the movable object module to report position information to a first non-owning entity 218.

In one embodiment, the processing device 226 of the movable object module 220 controls the movable object module 220. In one embodiment, the position data store 232 stores the position information. In yet another embodiment, the position information transmitter 224 is coupled with the location determining component 222, and transmits the position information to the position information receiver 212. In one embodiment, the reporting instruction receiver 228 receives the reporting instruction. In another embodiment, the report module 230 reports the position information to the first non-owning entity 218 according to the reporting instruction.

Figure 2B:
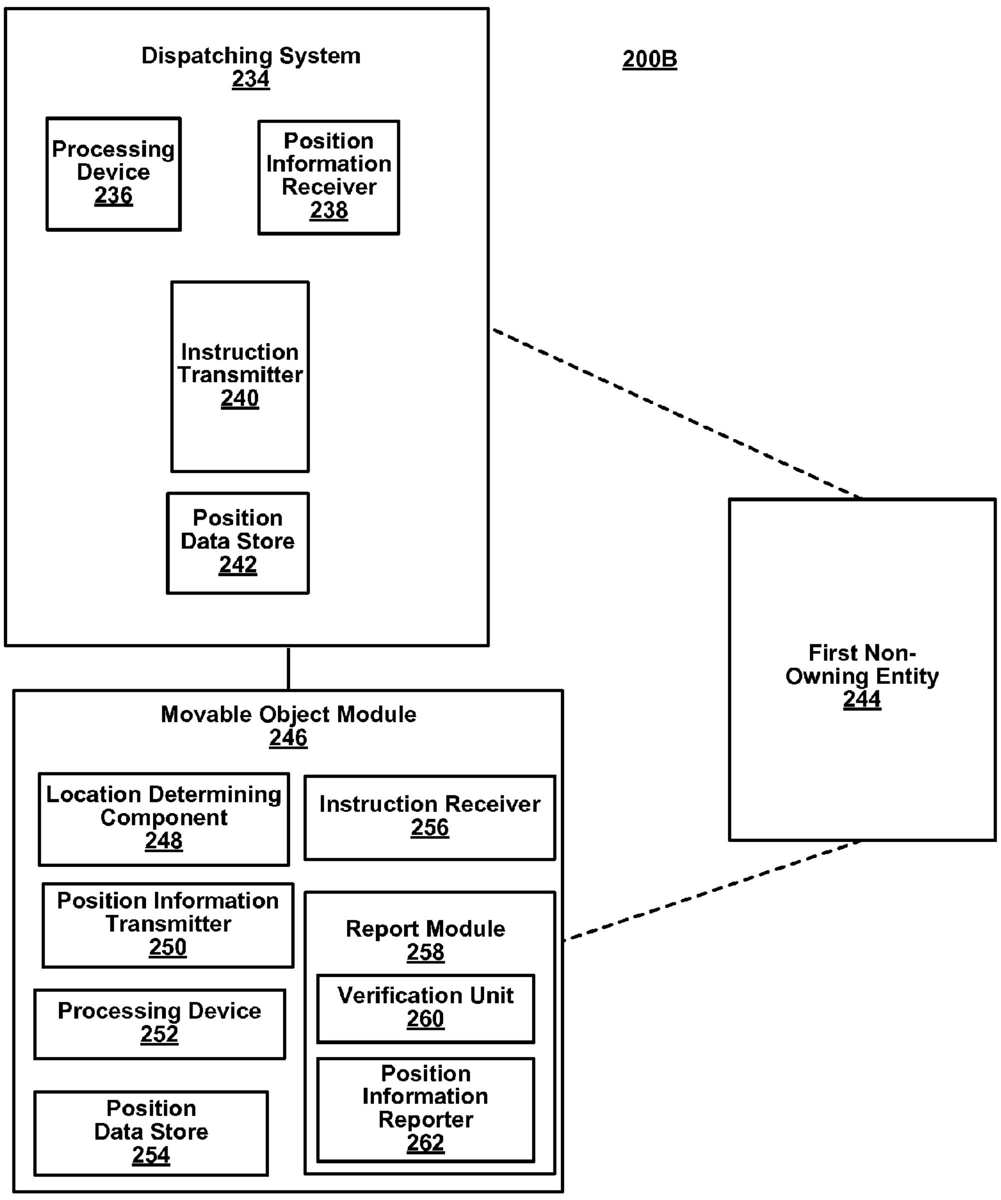
FIG. 2B is a block diagram of an example system for tracking assets, according to an embodiment of the present technology.

FIG. 2B shows a block diagram of an example asset tracking system 200B, in accordance with an embodiment of the present technology. In one embodiment, the asset tracking system 200B includes a dispatching system 234 and a movable object module 246. FIG. 2B shows an asset tracking system 200B in which only the movable object module 246 may report position information to a non-owning entity.

In one embodiment, the dispatching system 234 includes a processing device 236, a position information receiver 238, a first position data store 242 and an instruction transmitter 240. In one embodiment, the processing device 236 controls the dispatching system 234. In another embodiment, the position information receiver 238 receives position information associated with a movable object. In one embodiment, the position data store 242 stores the position information. In yet another embodiment, the instruction transmitter 240 transmits a reporting instruction to the movable object module 242, instructing the movable object module 246 to report position information to the first non-owning entity 244.

In one embodiment, the movable object module 246 includes a processing device 252, a location determining component 248, a position data store 254, a position information transmitter 250, an instruction receiver 256 and a report module 258. In one embodiment, the processing device 252 controls the movable object module 246. In another embodiment, the location determining component 248 is coupled with the movable object and determines the position information corresponding to the movable object.

In one embodiment, the position information transmitter 250 is coupled with the location determining component 248 and transmits the position information to the position information receiver 238. In one embodiment, the instruction receiver 256 receives the reporting instructions from the dispatching system 234, in which the movable object module 246 is instructed to report position information to the first non-owning entity 244. In one embodiment, the report module 258 reports the position information to the first non-owning entity 244. The report module 258 includes a verification unit 260 and a position information reporter 262. In one embodiment, the verification unit 260 receives verification information corresponding to the first non-owning entity 244. In yet another embodiment, the position information reporter 262, upon receipt of the verification information, provides the position information to the first non-owning entity 244, wherein the position information is inaccessible to a second non-owning entity lacking the verification information.

Figure 3A:
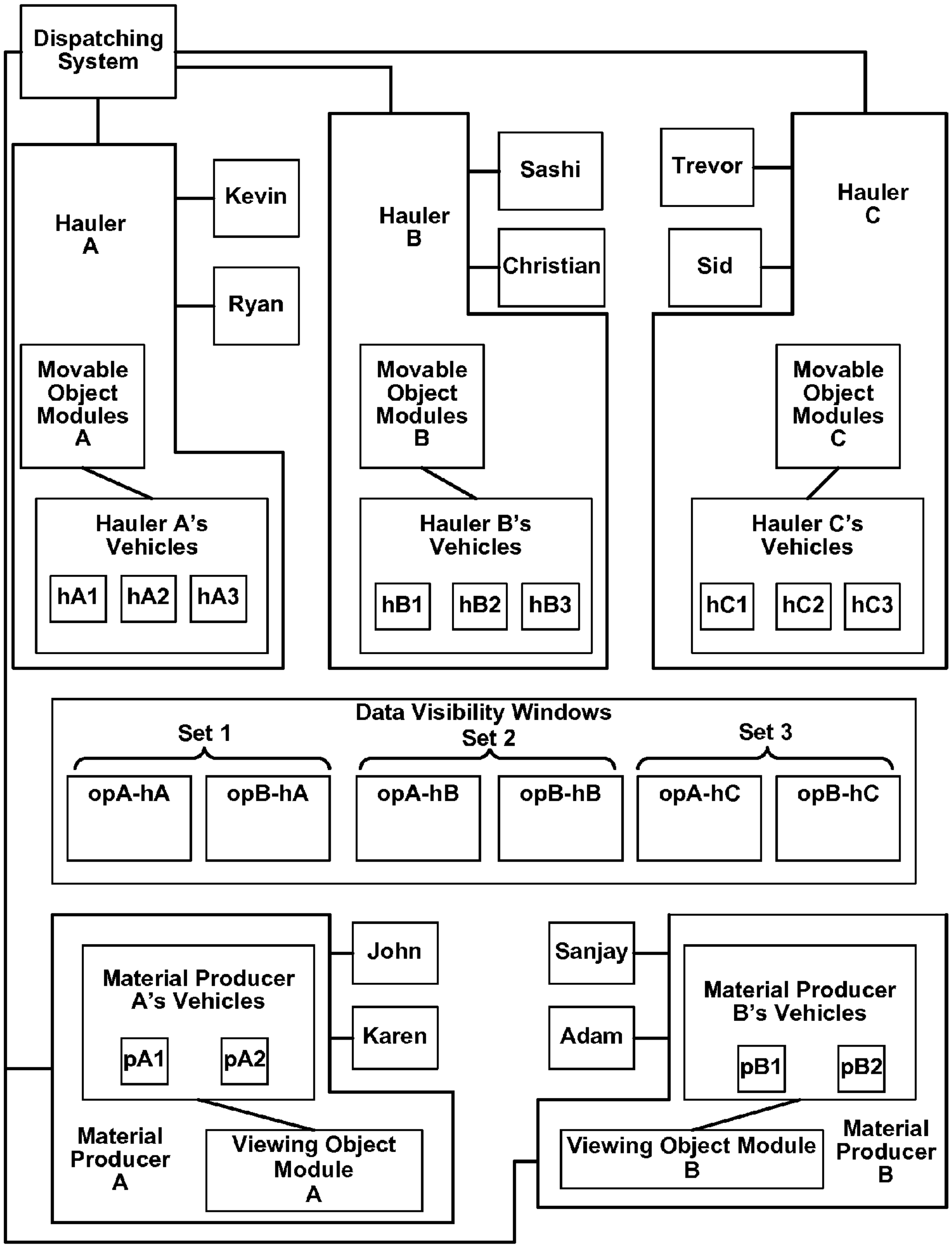
FIG. 3A is a diagram of an example operation of a system for tacking assets, according to an embodiment of the present technology.

FIG. 3A shows a diagram of an example relationship between the dispatching system, the movable object modules coupled with hauling trucks and the viewing modules coupled with material provider, in one embodiment of the present technology. Of note, the example of a hauling truck as a movable object is used herein for convenience. It should be appreciated that the movable object may be any sort of object that can move from one location to another. A movable object may be a bicycle, a mail truck, a city truck, a garbage truck, etc.

FIG. 3A shows Hauler A, Hauler B and Hauler C coupled with movable object module A, movable object module B and movable object module C, respectively. FIG. 3 also shows dispatching system coupled with Haulers A, B and C and also coupled with Material Providers A and B.

As shown, there are three sets of data visibility windows, 1, 2 and 3. Data visibility windows show what data is accessible for the viewing of each material producer having the matching verification information. The data visibility windows are labeled opA-hA, opB-hA, opA-hB, opB-hB, opA-hC and opB-hC. The pre-fix, for example, "opA" and "opB", of each label corresponds to the organization of a particular material provider. In this case, "opA" represents organization material provider A. Of note, the pre-fix in FIGS. 3A and 3B (as will be described in detail herein) of, opA, for example, is representative of the verification information that must be presented to the dispatching system by the material provider A before the position information for the hauling trucks shown within the data visibility windows is made available to material provider A. The verification information may be numbers, letters, and/or symbols.

As shown, Hauler A is in control of three hauling trucks hA1, hA2 and hA3. Hauler B is in control of three hauling trucks hB1, hB2 and hB3. Hauler C is in control of three hauling trucks hC1, hC2 and hC3. Likewise, material provider A is in control of two hauling trucks pA1 and pA2. Provider B is in control of two hauling trucks pB1 and pB2. Viewing object modules A and B are coupled with material providers A and B, respectively. The dispatcher is coupled with movable object modules A, B and C as well as viewing object modules A and B.

In embodiments of the present technology, certain people from a dispatching system maintain the privilege to access the information. In some cases, this may be an administrator of the hauling company. In another embodiment, it may be an operator/administrator of the dispatching system. For example, in FIGS. 3A and 3B, Kevin and Ryan are shown to have access to Hauler A's position information. In order that administration/operators/certain people have access to Hauler A's position information, a verification process must be undertaken. For example and with reference to FIG. 3A, Kevin is granted viewing privileges of ohA, while Ryan is granted viewing privileges of ohA+opA-hA+opB-hA. Sashi and Christian are shown to have access to Hauler B's position information. Sashi is granted viewing privileges to ohB, while Christian is granted viewing privileges to ohB+opA-hB+opB-hB. C1 Trevor and Sid are shown to have access to Hauler C's position information. Trevor is granted viewing privileges to ohC, while Sid is granted viewing privileges to ohC+opA-hC+opB-hC.

John and Karen are shown to have access to material producer A's information. John is granted viewing privileges to opB, while Karen is granted viewing privileges to opA+opA-hA+opA-hB+opA-hC. Sanjay and Adam are shown to have access to material producer B's information. Sanjay is granted viewing privileges to opB, while Adam is granted viewing privileges to opB+opB-hA+opB-hB+opB-hC.

Thus, given the aforementioned sets of data visibility windows 1, 2 and 3 and granted viewing privileges, the visibility of data for each person is determined to be the following: Kevin and Ryan are able to view hA1, hA2 and hA3. Sashi and Christian are able to view hB1, hB2 and hB3. Trevor and Sid are able to view hC1, hC2 and hC3. John and Karen are able to view pA1 and pA2. Sanjay and Adam are able to view pB1 and pB2.

Figure 3B:
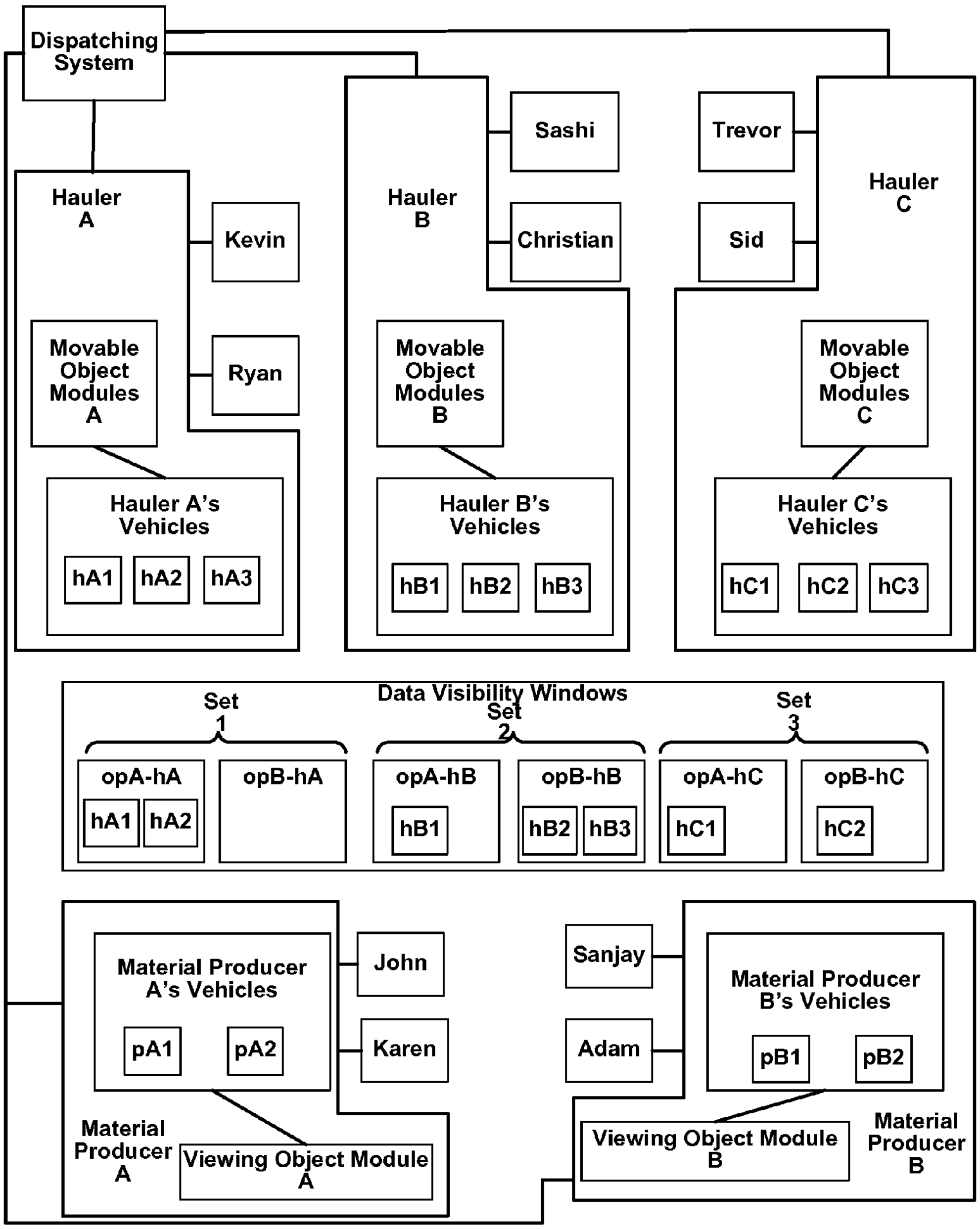
FIG. 3B is a diagram of an example operation of a system for tacking assets, according to an embodiment of the present technology.

FIG. 3B shows a diagram of an example relationship and data viewing ability between the dispatching system, the movable object module and the material provider once hauling trucks have been assigned to haul a particular material of a particular material producer, given the aforementioned granted viewing privileges.

For example, Hauler A is assigned trucks hA1 and hA2 to haul for Material Producer A. hA3 will haul for Hauler A. Hauler B is assigned truck hB1 to haul for Material Producer A. hB2 and hB3 will haul for Material Producer B. Hauler C is assigned truck hC1 to haul for Material Producer A. hC2 will haul for material Producer B and hC3 will haul for Hauler C.

Given the hauling assignments (assigned verification information), FIG. 3B presents a visual representation of what position information corresponding to a particular hauling vehicle each administrator and/or operator are allowed to view. Kevin is able to view just hA3, while Ryan is able to view hA1, hA2 and hA3. Sashi is not able to view any information, while Christian is able to view hB1, hB2 and hB3. Trevor is able to view hC3, while Sid is able to view hC1, hC2 and hC3. John is able to view pA1 and pA2, while Karen is able to view pA1, pA2, hA1, hA2, hB1 and hC1. Sanjay is able to view pB1 and pB2, while Adam is able to view pB1, pB2, hB2, hB3 and hC2.

Thus, when different movable objects, such as but not limited to hauling vehicles, are assigned to haul for different material producers, embodiments of the present technology limit the ability of one material producer to view the position information associated with the delivery of another material producer's material without the proper verification information being presented.

Operation

Embodiments of the present technology provide a system for enabling a material provider to track a material's delivery route without revealing this route to other material providers that are using the same delivery company. Further, embodiments may be employed to send and receive messages regarding a shipment, generate reports and adjust schedules such that operational costs are reduced and customer satisfaction is increased.

In brief, and more particularly, a dispatching system, a movable object module and a viewing object module operate concurrently to enable close and secure monitoring of a material's delivery. Take the example in which Material Provider A produces concrete. It should be appreciated that while the example of concrete is used herein, embodiments of the present technology are not limited to such. Material Provider A contracts with Hauler A to haul concrete to site A. Material Provider A is equipped with a viewing object module, in accordance with embodiments of the present technology. Hauler A is equipped with a dispatching system A, in accordance with embodiments of the present technology. Further, Hauler A's Hauling Vehicle A that will haul the concrete from Material Provider A's plant to site A is also equipped with a movable object module, in accordance with embodiments of the present technology.

Material Provider A wishes to follow the delivery route of Hauling Vehicle A to site A. Material Provider A requests of Dispatcher A access to position information A that corresponds to Hauling Vehicle A. Dispatcher A receives this request for access. Dispatcher A then sends a verification message to Material Provider A in an effort to determine if in fact Material Provider A had in fact requested access and wishes to view the position information for Hauling Vehicle A.

Material Provider A receives this verification message and returns a message to Dispatcher A that Material Provider A did indeed send the access request and wishes to view the position information for Hauling Vehicle A. Dispatcher A then determines if Material Provider A is allowed to view Hauling Vehicle A's position information. Once positively determined, Dispatcher A assigns and sends to Material Provider A unique verification information that Material Provider A must present to Dispatcher A before any position information for Hauling Vehicle A is made available.

Material Provider A presents to Dispatcher A the verification information. Upon presentation of this verification information, Dispatcher A makes available to Material Provider A the position information for Hauling Vehicle A. In one embodiment, Dispatcher A sends this position information to Material Provider A. In another embodiment, Material Provider A retrieves the position information from Hauling Vehicle A.

Significantly, without presenting the correct verification information to the dispatching system, a Material Provider will not be provided access to requested position information. Additionally, multiple Material Providers may access the same position information, given the presentation of unique verification information, in order to monitor the delivery of a shipment.

For example, Material Producer A and B both use the same hauling vehicle throughout the day to ship its' material. Without requiring intervention by the hauling vehicle's operator, embodiments of the present technology enable both Material Producers A and B to track the same vehicle throughout the day for as long as the owning entity of the hauling vehicle permits. In one embodiment, the extent of this access begins and ends with the beginning and ending of the material's route to the delivery site.

In one embodiment, only Hauler A (the owning entity) may decide to terminate Material Provider A's access to the position information for Hauling Vehicle A. Hauler A does not have to request permission from Material Provider A to terminate this access.

Communication of the foregoing requests and responses, in one embodiment, is performed wirelessly via email. Records are kept of the communications.

In one embodiment, the dispatching system is located at the owning entity, such as Hauler A. In another embodiment, the dispatching system is located external to the owning entity. The people administering the dispatching system may or may not be employed by the owning entity.

Figure 4:
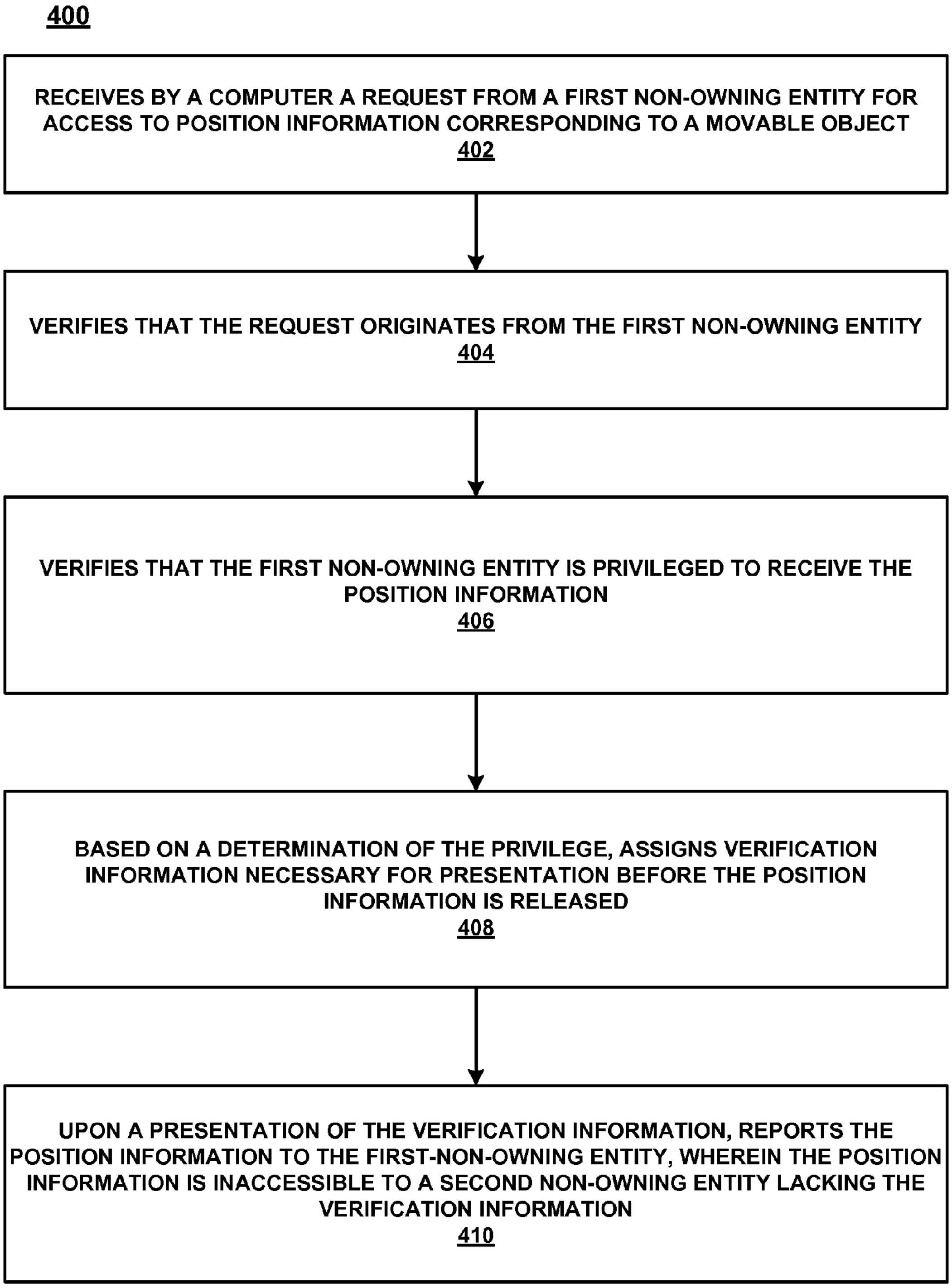
FIG. 4 is a flow diagram of a method for tracking assets, according to an embodiment of the present technology.

FIG. 4 is a flow diagram of a method 400 for tracking assets during delivery, according to an embodiment of the present technology. The method 400 is described below with reference to FIGS. 1A-3B.

At 402 and as described herein, in one embodiment a request is received, by a computer, from a first non-owning entity for access to position information corresponding to a movable object.

At 404 and as described herein, in one embodiment the request of 402 is verified that it originates from the first non-owning entity.

At 406 and as described herein, in one embodiment it is verified that the first non-owning entity is privileged to receive the position information.

At 408 and as described herein, in one embodiment, based on a determination of the privilege, verification information necessary for presentation is assigned before the position information is released. In one embodiment, a pre-fix as part of the verification information is assigned. The pre-fix is associated with a transporter of the movable object.

At 410 and as described herein, in one embodiment, upon a presentation of the verification information, the position information is reported to the first non-owning entity. However, the position information is inaccessible to a second non-owning entity lacking the verification information.

Figure 5:
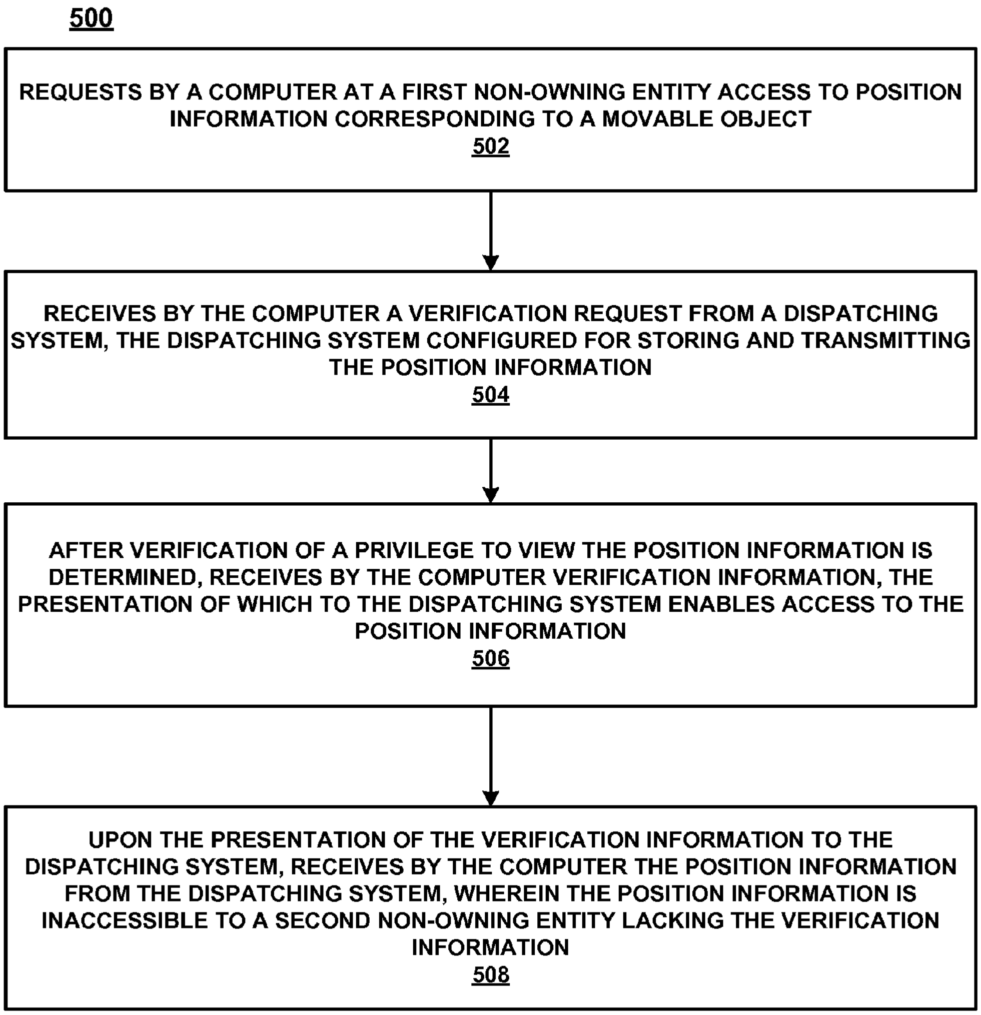
FIG. 5 is a flow diagram of a method for tracking assets, according to an embodiment of the present technology.

FIG. 5 is a flow diagram of a method 500 for tracking assets during delivery, according to an embodiment of the present technology. The method 500 is described below with reference to FIGS. 1A-3B.

At 502 and as described herein, in one embodiment access to position information corresponding to a movable object is requested by a computer at a first non-owning entity.

At 504 and as described herein, in one embodiment a verification request is received by a computer from the dispatching system. The dispatching system stores and transmits the position information.

At 506 and as described herein, in one embodiment, after verification of a privilege to view the position information is determined, verification information is received by the computer. The presentation of this verification information to the dispatching system then enables access t the position information stored thereon. In one embodiment, the verification information that is received is a pre-fix, wherein the pre-fix is associated with a transporter of the movable object.

At 508 and as described herein, in one embodiment, upon presentation of the verification information to the dispatching system, position information is received by the computer from the dispatching system. However, this position information is inaccessible to a second non-owning entity lacking the verification information. on a determination of the privilege, verification information.

Figure 6:
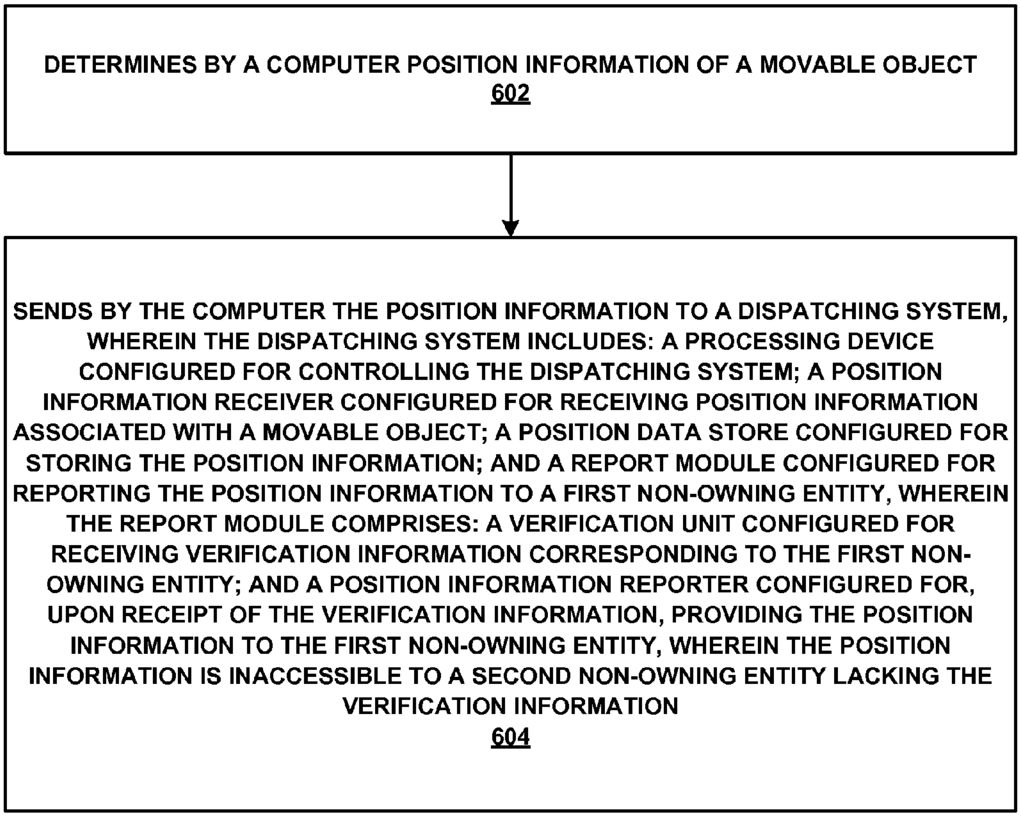
FIG. 6 is a flow diagram of a method for tracking assets, according to an embodiment of the present technology.

FIG. 6 is a flow diagram of a method 600 for tracking assets during delivery, according to an embodiment of the present technology. The method 600 is described below with reference to FIGS. 1A-3B.

At 602 and as described herein, in one embodiment position information of a movable object is determined by a computer.

At 604 and as described herein, in one embodiment the position information is sent to a dispatching system. The dispatching system includes, and as described with reference to at least FIG. 1A, a processor, a position information receiver, a position data store and a report module.

Example Computer System Environment

Figure 7:
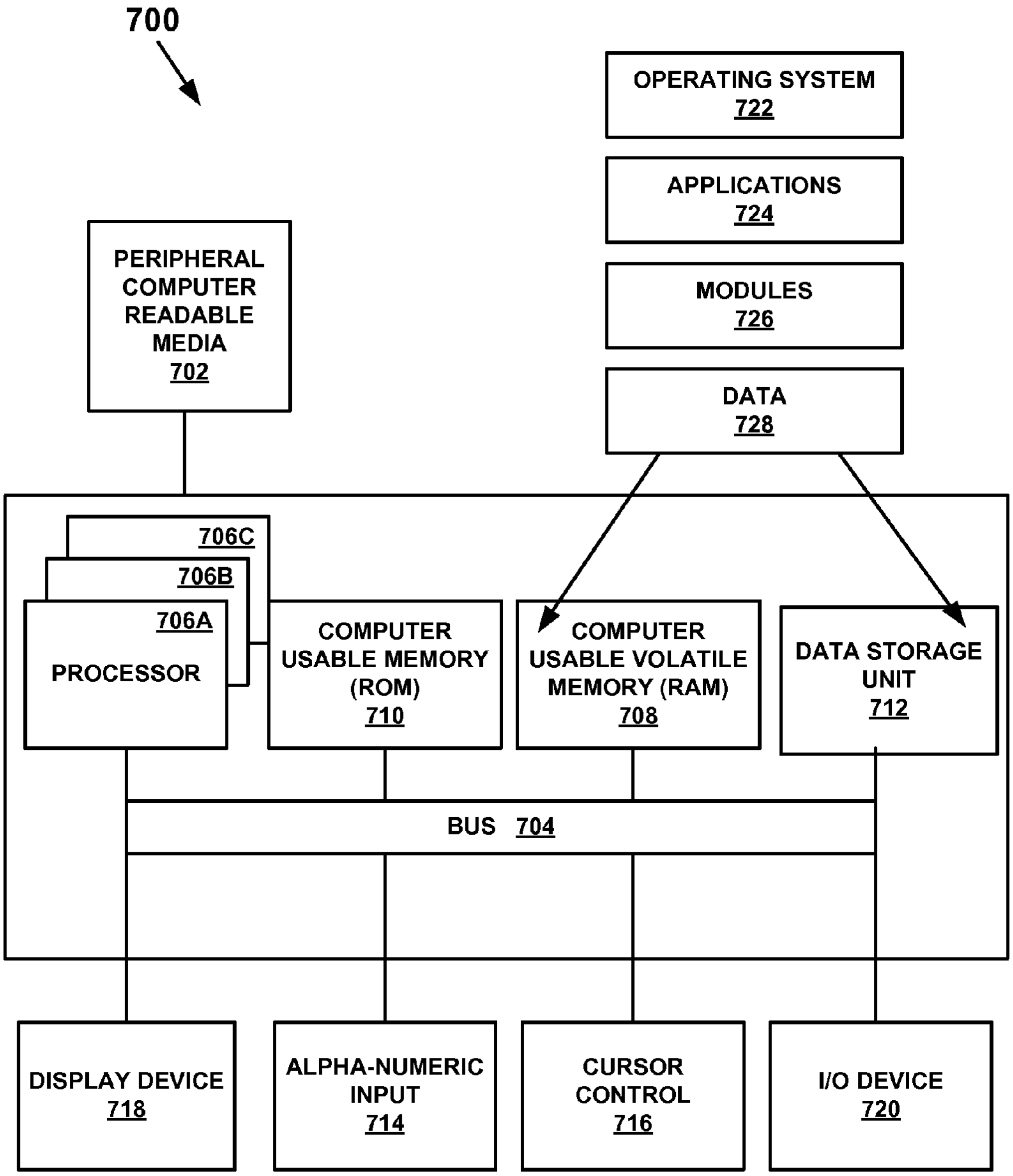
FIG. 7 is an example computer system, according to an embodiment of the present technology.

With reference now to FIG. 7, portions of the technology for tracking assets during delivery are composed of computer-readable and computer-executable instructions that reside, for example, in computer-readable storage media of a computer system. That is, FIG. 7 illustrates one example of a type of computer that can be used to implement embodiments, which are discussed below, of the present technology.

FIG. 7 illustrates an example computer system 700 used in accordance with embodiments of the present technology. It is appreciated that system 700 of FIG. 7 is an example only and that the present technology can operate on or within a number of different computer systems including general purpose networked computer systems, embedded computer systems, routers, switches, server devices, user devices, various intermediate devices/artifacts, stand alone computer systems, and the like. As shown in FIG. 7, computer system 700 of FIG. 7 is well adapted to having peripheral computer readable media 702 such as, for example, a floppy disk, a compact disc, and the like coupled thereto.

System 700 of FIG. 7 includes an address/data bus 704 for communicating information, and a processor 706A coupled to bus 704 for processing information and instructions. As depicted in FIG. 7, system 700 is also well suited to a multi-processor environment in which a plurality of processors 706A, 706B, and 706C are present. Conversely, system 700 is also well suited to having a single processor such as, for example, processor 706A. Processors 706A, 706B, and

706C may be any of various types of microprocessors. System 700 also includes data storage features such as a computer usable volatile memory 708, e.g. random access memory (RAM), coupled to bus 704 for storing information and instructions for processors 706A, 706B, and 706C.

System 700 also includes computer usable non-volatile memory 710, e.g. read only memory (ROM), coupled to bus 704 for storing static information and instructions for processors 706A, 706B, and 706C. Also present in system 700 is a data storage unit 712 (e.g., a magnetic or optical disk and disk drive) coupled to bus 704 for storing information and instructions. System 700 also includes an optional alphanumeric input device 714 including alphanumeric and function keys coupled to bus 704 for communicating information and command selections to processor 706A or processors 706A, 706B, and 706C. System 700 also includes an optional cursor control device 716 coupled to bus 704 for communicating user input information and command selections to processor 706A or processors 706A, 706B, and 706C. System 700 of the present embodiment also includes an optional display device 718 coupled to bus 704 for displaying information.

Referring still to FIG. 7, optional display device 718 of FIG. 7 may be a liquid crystal device, cathode ray tube, plasma display device or other display device suitable for creating graphic images and alphanumeric characters recognizable to a user. Optional cursor control device 716 allows the computer user to dynamically signal the movement of a visible symbol (cursor) on a display screen of display device 718. Many implementations of cursor control device 716 are known in the art including a trackball, mouse, touch pad, joystick or special keys on alpha-numeric input device 714 capable of signaling movement of a given direction or manner of displacement. Alternatively, it will be appreciated that a cursor can be directed and/or activated via input from alpha-numeric input device 714 using special keys and key sequence commands.

System 700 is also well suited to having a cursor directed by other means such as, for example, voice commands. System 700 also includes an I/O device 720 for coupling system 700 with external entities. For example, in one embodiment, I/O device 720 is a modem for enabling wired or wireless communications between system 700 and an external network such as, but not limited to, the Internet. A more detailed discussion of the present technology is found below.

Referring still to FIG. 7, various other components are depicted for system 700. Specifically, when present, an operating system 722, applications 724, modules 726, and data 728 are shown as typically residing in one or some combination of computer usable volatile memory 708, e.g. random access memory (RAM), and data storage unit 712. However, it is appreciated that in some embodiments, operating system 722 may be stored in other locations such as on a network or on a flash drive; and that further, operating system 722 may be accessed from a remote location via, for example, a coupling to the internet. In one embodiment, the present technology, for example, is stored as an application 724 or module 726 in memory locations within RAM 708 and memory areas within data storage unit 712. The present technology may be applied to one or more elements of described system 700. For example, a method for identifying a device associated with a transfer of content may be applied to operating system 722, applications 724, modules 726, and/or data 728.

The computing system 700 is only one example of a suitable computing environment and is not intended to suggest any limitation as to the scope of use or functionality of the present technology. Neither should the computing environment 700 be interpreted as having any dependency or requirement relating to any one or combination of components illustrated in the example computing system 700.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What we claim is:

1. An asset tracking system comprising:

a dispatching system comprising:

- a first processing device configured for controlling said dispatching system;
- a position information receiver configured for receiving position information associated with a vehicle, the position information including locations of the vehicle and velocities of the vehicle at different times;
- a position data store configured for storing said position information;
- a report module configured for reporting said position information to at least a first entity and a second entity, the first entity being a non-owning entity of the vehicle and an owning entity of first materials being transported by the vehicle, and the second entity being a non-owning entity of the vehicle and an owning entity of second materials being transported by the vehicle, wherein said report module comprises:
  - a verification unit configured for receiving first verification information from the first entity, the first verification information associated with both the first entity and the first materials, the verification unit also configured for receiving second verification information from the second entity, the second verification information associated with both the second entity and the second materials; and a position information reporter configured for, upon receipt of said first verification information, providing said position information and information associated with the first materials to said first entity without providing information associated with the second materials to said first entity, the position information reporter also configured for, upon receipt of said second verification information, providing said position information and information associated with the second materials to the second entity without providing information associated with the first materials to said second entity; and a termination module configured for disabling position information reporting, the termination module controlled by a third entity, the third entity being an owning entity of the vehicle; and a movable object module comprising:

a location determining component coupled with said vehicle, said location determining component configured for determining said position information; and a position information transmitter coupled with said location determining component, said position information transmitter configured for transmitting said position information to said position information receiver; and a display device comprising a plurality of data visibility windows showing what data is accessible for viewing by the first entity and the second entity, and wherein each of the plurality of data visibility windows indicates the verification information that must be presented to the dispatching system by the first entity and the second entity before the data is made accessible for viewing to the first entity and the second entity.

2. The asset tracking system of claim 1, wherein said dispatching system further comprises:

an first input device configured for receiving input information from the third entity.

3. The asset tracking system of claim 1, wherein said dispatching system further comprises:

a first graphical user interface.

4. The asset tracking system of claim 1, wherein said dispatching system further comprises:

a request receiver configured for receiving a request from said first entity and said second entity for access to said position information.

5. The asset tracking system of claim 1, wherein said termination module comprises:

a termination request receiver configured for receiving a request from the third entity to disable said position information reporter.

6. The asset tracking system of claim 1, wherein said dispatching system further comprises:

a time stamper configured for stamping said position information with a time.

7. The asset tracking system of claim 1, wherein said movable object module further comprises:

a second processing device configured for controlling said movable object module.

8. The asset tracking system of claim 1, wherein said movable object module further comprises:

a second input device configured for receiving input information.

9. The asset tracking system of claim 1, wherein said movable object module further comprises:

a second graphical user interface.

10. The asset tracking system of claim 1, wherein said movable object module further comprises:

an instruction receiver configured for receiving an instruction associated with said vehicle.

11. The asset tracking system of claim 10, wherein said instruction is a hauling instruction.

12. The asset tracking system of claim 1, wherein said viewing object module further comprises:

a third input device configured for receiving input information.

13. The asset tracking system of claim 1, wherein said viewing object module further comprises:

a third graphical user interface.

14. The asset tracking system of claim 1, wherein said movable object module is configured to be coupled with a set of sensors, each sensor of said set of sensors being configured to collect status information associated with said vehicle.

15. The asset tracking system of claim 1, wherein said verification unit comprises:

a pre-fix assigner configured for assigning a pre-fix as part of said verification information, wherein a first pre-fix is associated with the vehicle, the first entity, and the first materials, and a second pre-fix is associated with the vehicle, the second entity, and the second materials.

16. The asset tracking system of claim 1, wherein said location determining component is a global navigation satellite system receiver.

17. An asset tracking system comprising:

a dispatching system comprising:

a first processing device configured for controlling said dispatching system;

a position information receiver configured for receiving position information associated with a vehicle, the position information including locations of the vehicle and velocities of the vehicle at different times;

a first position data store configured for storing said position information;

a first report module configured for reporting said position information to at least a first entity and a second entity, the first entity being a non-owning entity of the vehicle and an owning entity of first materials being transported by the vehicle, and the second entity being a non-owning entity of the vehicle and an owning entity of second materials being transported by the vehicle, wherein said first report module comprises:

a verification unit configured for receiving first verification information from the first entity, the first verification information associated with both the first entity and the first materials, the verification unit also configured for receiving second verification information from the second entity, the second verification information associated with both the second entity and the second materials;

a position information reporter configured for, upon receipt of said first verification information, providing said position information and information associated with the first materials to said first entity without providing information associated with the second materials to said first entity, the position information reporter also configured for, upon receipt of said second verification information, providing said position information and information associated with the second materials to the a second entity without providing information associated with the first materials to said second entity; and a reporting instruction transmitter configured for transmitting a reporting instruction; and a termination module configured for disabling position information reporting, the termination module controlled by a third entity, the third entity being an owning entity of the vehicle; and a movable object module comprising:

a second processing device configured for controlling said movable object module;

a location determining component coupled with said vehicle, said location determining component configured for determining said position information;

a second position data store configured for storing said position information;

a position information transmitter coupled with said location determining component, said position information transmitter configured for transmitting said position information to said position information receiver;

a reporting instruction receiver configured for receiving said reporting instruction; and a second report module configured for reporting said position information to said first entity and said second entity according to said reporting instruction; and a display device comprising a plurality of data visibility windows showing what data is accessible for viewing by the first entity and the second entity, and wherein each of the plurality of data visibility windows indicates the verification information that must be presented to the dispatching system by the first entity and the second entity before the data is made accessible for viewing to the first entity and the second entity.

18. An asset tracking system comprising:

a dispatching system comprising:

a first processing device configured for controlling said dispatching system;

a position information receiver configured for receiving position information associated with a vehicle, the position information including locations of the vehicle and velocities of the vehicle at different times;

a first position data store configured for storing said position information ;

an instruction transmitter configured for transmitting a moving instruction for said vehicle; and a termination module configured for disabling position information reporting, the termination module controlled by an owning entity of the vehicle; and a movable object module comprising:

a second processing device configured for controlling said movable object module;

a location determining component coupled with said vehicle, said location determining component configured for determining said position information;

a second position data store configured for storing said position information;

a position information transmitter coupled with said location determining component, said position information transmitter configured for transmitting said position information to said position information receiver; and a report module configured for reporting said position information to a first entity and a second entity, the first entity being a non-owning entity of the vehicle and an owning entity of first materials being transported by the vehicle, and the second entity being a non-owning entity of the vehicle and an owning entity of second materials being transported by the vehicle, wherein said report module comprises:

a verification unit configured for receiving first verification information from the first entity, the first verification information associated with both the first entity and the first materials, the verification unit also configured for receiving second verification information from the second entity, the second verification information associated with both the second entity and the second materials; and a position information reporter configured for, upon receipt of said first verification information, providing said position information and information associated with the first materials to said first entity without providing information associated with the second materials to said first entity, the position information reporter also configured for, upon receipt of said second verification information, providing said position information and information associated with the second materials to the second entity without providing information associated with the first materials to said second entity; and a display device comprising a plurality of data visibility windows showing what data is accessible for viewing by the first entity and the second entity, and wherein each of the plurality of data visibility windows indicates the verification information that must be presented to the dispatching system by the first entity and the second entity before the data is made accessible for viewing to the first entity and the second entity.

* * * * *